United States Patent Office 3,738,966
Patented June 12, 1973

3,738,966
PROCESS FOR THE MANUFACTURE OF LINEAR HIGH POLYMERIC POLY-N-ALKYLHYDRAZIDES
Josef Studinka, Zurich, and Rudolf Gabler, Uitikon, Switzerland, assignors to Inventa A.G. fur Forschung und Patentverwertung, Zurich, Switzerland
No Drawing. Filed Oct. 19, 1971, Ser. No. 190,677
Claims priority, application Switzerland, Oct. 29, 1970, 15,982/70
Int. Cl. C08g 20/20, 33/04
U.S. Cl. 260—65       10 Claims

ABSTRACT OF THE DISCLOSURE

A process for the manufacture of a linear high polymeric poly-N-alkylhydrazide wherein a hydrazine is condensed in chlorosulphonic acid at an elevated temperature with an aromatic dicarboxylic acid diester. The hydrazine optionally has a lower alkyl substitution at one of its hydrogen atoms.

---

The subject of the present invention is a process for the manufacture of linear highly polymeric poly-N-alkylhydrazides and the poly-N-alkylhydrazides obtained by this process.

Linear aromatic polymers with two singly bound nitrogen atoms in the chain have important technical interest for the manufacture of synthetic fibers, which may either be used directly as such for textile purposes or can be converted by thermic cyclo-dehydration into the high temperature resistant polyoxadiazole fibres. Although the latter may be made directly from polyoxadiazoles by wet spinning in oleum or polyphosphoric acid, the indirect route through the polyhydrazide fibers is advantageously used, since these are soluble in organic solvents and can reasonably be dry spun.

In the literature several processes have been described for the production of aromatic polymers, with two adjacent singly bound nitrogen atoms in the chain. They all have in common that an aromatic dicarboxylic acid or a suitable derivative is treated with hydrazine or a hydrate, salt or alkylation product of hydrazine. The processes only differ in the kind of reaction medium employed. Thus McFarlane and Miller (U.S. Pat. No. 2,615,862) used xylenols or nitrobenzene as the reaction medium within the temperature range 170° to 200° C. They could however only obtain low molecular products. Frazer and Wallenberger (Journal Pol. Sci. A2, 1964, 1137) developed a low temperature polycondensation process according to which acid dihydrazides are treated with acid chlorides at 0°–20° C. in hexamethylphosphoric acid triamide or N-methyl-pyrrolidone. This process is not only tedious since it must be carried out in two stages, but uneconomic since it uses expensive acid chlorides and solvents.

According to a third method, fuming sulphuric acid or polyphosphoric acid was proposed as the reaction medium (Iwakura, Japanese patent publ. 68/15,633, Japanese patent publ. 68/29,959). These reaction media also have disadvantages which make difficult the production of technically usable polymers of the hydrazide type. By reason of the strong oxidizing action of the free sulphur trioxide dissolved in oleum, technical grades of oleum are always dark coloured. The yellow to brown colour is transferred to the articles, e.g. fibres or foils made from the polymer solution. A further change of colour to red tones takes place by oxidation of small quantities of oxidisable impurities which are present in the technical starting materials, particularly the hydrazine salts.

A further disadvantage of oleum as the reaction medium is the high vapor pressure of the dissolved sulphur trioxide, which at the necessary reaction temperature of 80° to 140° C. partially comes out of solution, precipitates on the colder parts of the apparatus, and in consequence of its tendency to form high-melting condensation products may lead to blocks in the conduits and fittings.

Also, only colored products are formed with polyphosphoric acid as solvent and condensation medium. As a further disadvantage it happents that polyphosphoric acid has a high specific viscosity. Polyhydrazide solutions with the molecular weight and concentration ranges of technical interest become so viscous that they cannot be stirred or filtered.

It has now been found that chlorosulphonic acid forms a new and very suitable solvent and condensing agent for the production of linear aromatic polyhydrazides, which shows none of the disadvantages mentioned above of the formerly used reaction media. The suitability of chlorosulphonic acid is particularly surprising, since according to previous knowledge polymers with two adjacent singly bound nitrogen atoms were decomposed by strong concentrated acids.

Chlorosulphonic acid is, in technical quality, a colorless liquid, which on heating does not release $SO_3$ and has no oxidizing action. Since chlorosulphonic acid is, moreover, a good solvent of low specific viscosity, high molecular polyhydrazides in required concentration range of 10–15 g. per 100 g. of solvent can be made surprisingly easily without difficulties arising over stirring or filtration.

The present invention thus concerns a process for the manufacture of linear, highly polymeric poly-N-alkylhydrazides with repeating structural units of the formula:

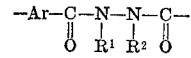

wherein Ar is a divalent aromatic radical inert to sulphonation, whose linkages to the adjacent substituents are separated by a chain of at least three carbon atoms, $R^1$ is hydrogen or a lower alkyl group, and $R^2$ is a lower alkyl group. The polymer is prepared either (a) by condensation of an aromatic dicarboxylic acid diester with a hydrazine, one of whose four hydrogen atoms may be substituted by lower alkyl;

(b) or by condensation of an aromatic dicarboxylic acid or its dihalide, dinitrile, diamide or di-alkali metal salt with a hydrazine, one of whose four hydrogen atoms is or two of whose hydrogen atoms not linked to the same nitrogen atom are replaced by lower alkyl;

(c) or by condensation of an aromatic dicarboxylic acid monoester with a hydrazine, one of whose four hydrogen atoms is substituted by lower alkyl;

at elevated temperature, characterized in that the polycondensation is carried out in chlorosulphonic acid, if desired, in the presence of concentrated sulphuric acid and/or an alkylating agent. "Lower alkyl" here denotes any alkyl with up to 4 carbon atoms, particularly the methyl or ethyl group. Ar advantageously denotes a 1,3- or 1,4-phenylene radical, a naphthalene radical, or a radical of the formula:

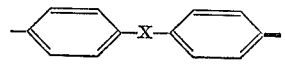

in which X is a direct linkage or the groups —CO—, $-SO_2-$ or —N=N—.

As starting compounds, according to the choice of the variants (a)–(c) which are used: terephthalic acid, isophthalic acid, tetrachloroterephthalic acid, 5-methylisophthalic acid, naphthalene-2,6- or -1,4-dicarboxylic acid, benzophenone-4,4'-dicarboxylic acid, azobenzene-4,4'-dicarboxylic acid (if its color is harmless; in general, colorless starting materials are preferred), or diphenylsulphone-4,4'-dicarboxylic acid or the mono and diesters thereof, particularly the dialkylesters, especially dimethyl or diethyl esters, also dihalides, particularly dichlorides, diamides, or di-alkali metal salts, advantageously disodium salts.

The hydrazine, whether substituted or not, is usually employed in the form of its inorganic salts, usually as the sulphate. Thus, there may be used the sulphate of hydrazine, N-methyl-, N-ethyl-, or N, N'-dimethyl-, or N-N'-diethylhydrazine.

Of the three variants of the condensation (a), (b) and (c), (a) is preferred.

According to variant (a), the reaction using unsubstituted hydrazine has a course in the main according to the following scheme:

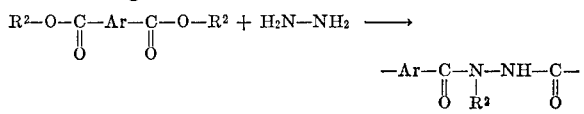

The lower alkyl radical R² of the diester thus attaches itself to one N of the hydrazide. If one starts from a mixed diester, e.g. from monomethyl monoethyl terephthalate, one obtains a mixture of end products with the groups:

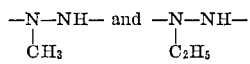

If the dicarboxylic ester is replaced by hydrazine substituted in accordance with the definition, e.g. with N-methyl hydrazine or its sulphate, an end product is obtained in which both N-atoms of the hydrazide group are substituted, in accordance with the scheme.

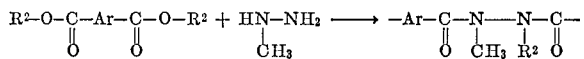

Suitable compounds are e.g. dimethyl terephthalate, dimethyl isophthalate, dimethyl tetrachloroterephthalate, dimethyl 5-methyl-isophthalate, dimethyl naphthalene-2,6 - dicarboxylate, dimethyl - benzophenone - 4,4'-dicarboxylate, and dimethyl azobenzene-4,4'-dicarboxylate.

Quite generally in the reaction of aromatic dicarboxylic acid alkyl esters with hydrazine or inorganic salts thereof in the presence of chlorosulphonic acid, according to the reaction conditions, together with open hydrazide compounds, there may also be formed 5–30% of closed 1,3,4-oxadiazole rings. To exclude or suppress this frequently undesired side reaction, which can lead to insolubility of the polymers in organic solvents, it is preferable to conduct the reaction in the presence of alkylating agents, e.g. lower aliphatic alcohols or dialkyl sulfate.

According to variant (b), the reaction progresses according to the scheme:

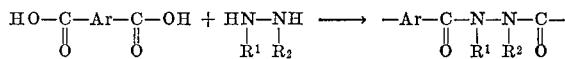

in which R¹ and R² have the significance stated in the definition. Analogously the reaction progresses with the use of the corresponding di-alkali metal salts, dihalides, dinitriles, and diamides. Suitable starting materials, e.g. are terephthalic acid, isophthalic acid, 5 - methyl - isophthalic acid, tetrachloroterephthalic acid, naphthalene-2,6-dicarboxylic acid, naphthalene-1,4-dicarboxylic acid, terephthalic acid dinitrile or isophthalic acid diamide.

As hydrazine compounds, N-methyl-hydrazine, N,N'-dimethyl-hydrazine and their hydro chlorides and sulphates are suitable.

By the use of two or three of these dicarboxylic acids or their esters, halides, nitriles, amides, or alkali metal salts according to variants (a) to (c), valuable copolymers or terpolymers may be made. Particularly recommended is a mixture of terephthalic acid and isophthalic acid or their alkyl esters.

Particularly favorable and products are obtained by reaction of: 1 mol of dimethyl terephthalate with ½ mol of dihydrazine sulphate or mixtures of dimethyl terephthalate and isophthalate with hydrazine sulphate, in both cases preferably with the addition of alkylating agents like methanol or dimethyl sulphate, or of 1 mol of terephthalic acid with 1 mol of N-monomethyl hydrazine, or of 1 mol of disodium isophthalate with 1 mol of N,N'-dimethyl hydrazine sulphate, or of 1 mol dipotassium benzophenone-4,4'-dicarboxylate with 1 mol of dimethyl hydrazine hydrochloride.

Working is advantageously performed with at least 2 mols of chlorosulphonic acid per 1 mol of aromatic dicarboxylic acid or its derivative as defined above, and in the presence of concentrated sulphuric acid.

The said aromatic dicarboxylic acids or their derivatives as defined above [according to variants (a) to (c)], the hydrazine or its salt and the chlorosulphonic acid are used in such quantitative proportions that to each 1 mol of the aromatic compound and hydrazine compound at least 2 mols of chlorsulphonic acid are used. Preferably, however, working is performed with an excess of chlorosulphonic acid or with mixtures of chlorosulphonic acid and concentrated sulphuric acid, in order to restrain the polymer concentration and thus the viscosity of the solution within practical limits.

For all three variants the reaction is advantageously carried out within the temperature range of 50°–200° C. A temperature range of 80°–140° C. is preferred.

The poly-N-alkyl-hydradides made in accordance with the present invention can be formed into fibres or films directly from the highly viscous, preferably about 10% solution, by injection into a suitable precipitating bath. Known precipitating baths are e.g. dilute sulphuric acid and concentrated aqueous solutions of zinc chloride or ammonium sulphate.

However, the polymer solutions may be precipitated in water and the colorless fibrous polymer obtained, after washing and drying, be dissolved in an organic solvent, like dimethyl sulphoxide, sulpholan, N,N-dimethylacetamide or N-methylpyrrolidone and from this be worked up into fibres by the dry spinning process, or to foils or coatings by a casting process. The articles formed from the polyhydrazides made in accordance with the invention are tough, elastic, resistant to tearing and only melt at temperatures above 300° C. By prolonged heating at 200°–260° C., the polyhydrazides split off water or alcohol and are converted to the essentially heat-resistant poly-1,3,4-oxadiazoles.

The following examples illustrate the invention:

EXAMPLE 1

In a two litre three-necked flask, provided with stirrer, thermometer and reflux condenser, 194.19 g. (1.0 mol) of dimethyl terephthalate and 81.08 g. (0.5 mol) of dihydrazine sulphate are dissolved in a mixture of 600 g. of chlorosulphonic acid and 600 g. of concentrated sulphuric acid. The reaction mixture is heated to 140° C. during which a vigorous evolution of hydrogen chloride takes place. After one hour the colorless clear reaction solution becomes very viscous and the condensation is terminated. A test portion of the reaction mixture is precipitated whilst stirring in water and the white granular powder is washed until neutral and dried. The reduced specific viscosity amounts to 4.10 (measured in 100% sulphuric acid, 0.2 g. per 100 ml. at 20° C.).

Micro elementary analysis yields the following values:

Found (percent): C, 62.75; H, 4.10; N, 16.79. Calculated (on 25% polyoxadiazole content) (percent): C, 62.19; H, 4.13; N, 16.80.

The infrared spectrum shows a very strong carbonyl band at 1680 cm.⁻¹ and a weak absorption band at 970 cm.⁻¹ (-1,3,4-oxadiazole). On the basis of the analytical data, about 25% of the N-methyl hydrazide groups are cyclicized to 1,3,4-oxadiazole rings. The product is only soluble in sulphuric acid.

The main part of the reaction mixture is used directly for spinning experiments. Colorless fibres of very high strength can be spun in 50% sulphuric acid, as a coagulating bath.

EXAMPLE 2

A similar procedure to that of Example 1 was carried out with the difference that a mixture of 145.8 g. (0.75 mol) of dimethyl terephthalate and 48.4 g. (0.25 mol) of dimethyl isophthalate was used. The condensation is carried out in the presence of 25 ml. of methanol. At 130° C. the reaction lasts 4 hours. A test portion, precipitated in water, washed and dried is soluble in dimethyl formamide, dimethyl acetamide, N-methyl pyrrolidone and dimethyl sulphoxide. In the infrared spectrum no oxidiazole band at 970 cm.$^{-1}$ can be recognized. The polyphenylene-N-methyl hydrazide with statistically distributed para and meta phenylene bonds melts at 320° to 340° C.

The reduced specific viscosity is 1.82 (measured in 100% sulphuric acid, 0.2 g. per 100 ml. at 20° C.).

EXAMPLE 3

The process is carried out as in Example 2. Instead of methanol, 50 g. of dimethyl sulphate are used. The product obtained is identical with that of Example 2. The reduced specific viscosity amounts to 2.08 (measured in 100% sulphuric acid, 0.2 g. per 100 ml. at 20° C.).

EXAMPLE 4

16.61 g. (0.1 mol) of isophthalic acid is introduced into a 250 ml. three-necked flask provided with a stirrer, thermometer and calcium chloride tube, and treated with 80 ml. of chlorosulphonic acid. The solution is heated to 50° C. whilst stirring, then 14.41 g. (0.1 mol) of methyl hydrazine sulphate is introduced and the mixture further heated. At 90° C. a strong evolution of hydrogen chloride commences and the viscosity rises slowly. The polycondensation is terminated at 130° C. in one hour. The poly-m-phenylen-N-methyl hydrazide is precipitated in ice water, washed to neutrality and dried. The product is freely soluble in dimethyl formamide. From such solutions films of high mechanical strength may be made.

The reduced specific viscosity of the polymer amounts to 1.70 (measured in N-methyl-pyrrolidone, 0.2 g. per 100 ml. at 20° C.).

EXAMPLE 5

The polycondensation is carried out as in Example 4 with the difference that instead of isophthalic acid, 31.42 g. (0.1 mol) of disodium benzophenone-4,4'-dicarboxylate are used. The product is soluble in N-methylpyrrolidone.

The reduced specific viscosity is 1.35 (measured in N-methylpyrrolidone, 0.2 g. per 100 ml. at 20° C.).

What is claimed is:

1. A process for the manufacture of linear highly polymeric poly-N-alkyl hydrazides with repeating structural units of the formula:

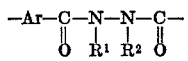

wherein

Ar is a divalent aromatic radical inert to sulphonation, said radical's linkages to the adjacent substituents being separated by a chain of at least 3 carbon atoms;
$R^1$ is hydrogen or lower alkyl;
$R^2$ is lower alkyl;

which comprises condensing in at least 2 mols of chlorosulphonic acid at a temperature of 50 to 200° C., hydrazine with one mole of (a) an aromatic dicarboxylic acid alkyl diester;
(b) an aromatic dicarboxylic acid or its dihalide, dinitrile, diamide or di-alkali metal salt; or
(c) an aromatic dicarboxylic acid alkyl mono ester;

said hydrazine having a lower alkyl substitution optionally at one of its nitrogen atoms when the condensation is with the aromatic dicarboxylic acid diester, or the aromatic dicarboxylic acid mono ester; or at one nitrogen atom, or on both nitrogen atoms when the condensation is with the aromatic dicarboxylic acid or its dihalide, dinitrile, diamide, or di-alkali metal salt.

2. The process as recited in claim 1 wherein the condensation takes place in the presence of concentrated sulfuric acid, an alkylating agent, or concentrated sulfuric acid and an alkylating agent, said alkylating agent being a lower aliphatic alcohol or dialkyl sulfate.

3. The process as recited in claim 1 wherein Ar is a 1,3 phenylene radical, a 1,4-phenylene radical, a naphthalene radical or a radical of the formula:

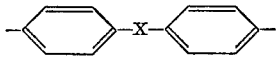

wherein X is a direct linkage, —CO—, —SO$_2$—, or —N=N—.

4. The process as recited in claim 1 wherein said temperature is from 80° to 140° C.

5. The process as recited in claim 1 wherein a mol ratio of 2:1 is maintained of dimethyl terephthalate to dihydrazine sulphate.

6. The process as recited in claim 1 wherein a mixture of dimethyl terephthalate and isophthalate is condensed with hydrazine sulphate.

7. The process as recited in claim 5 wherein the condensation is carried out in the presence of methanol or dimethyl sulphate as alkylating agents.

8. The process as recited in claim 1 wherein 1 mol of terephthalic acid is condensed with 1 mol of N-monomethyl hydrazine.

9. The process as recited in claim 1 wherein 1 mol of disodium isophthalate is condensed with 1 mol of N,N-dimethyl hydrazine sulphate.

10. The process as recited in claim 1 wherein 1 mol of dipotassium benzophenone-4,4'-dicarboxylate is condensed with 1 mol of dimethyl hydrazine hydrochloride.

References Cited

UNITED STATES PATENTS

| | | | |
|---|---|---|---|
| 3,642,708 | 2/1972 | Sekiguchi et al. | 260—78 |
| 3,644,297 | 2/1972 | Sekiguchi et al. | 260—78 |
| 3,130,182 | 4/1964 | Frazer | 260—78 |
| 3,238,183 | 3/1966 | Frazer | 260—78 |
| 3,275,608 | 9/1966 | Montgomery et al. | 260—78 |

WILLIAM H. SHORT, Primary Examiner

L. L. LEE, Assistant Examiner

U.S. Cl. X.R.

260—30.2, 30.8 DS, 32.6 N, 78 R